No. 631,229. Patented Aug. 15, 1899.
R. H. REEVES.
PROCESS OF TREATING SEWAGE.
(Application filed Dec. 29, 1897.)
(No Model.)
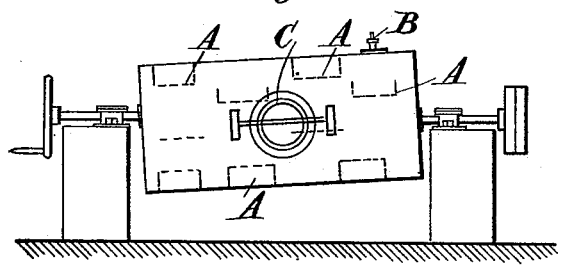
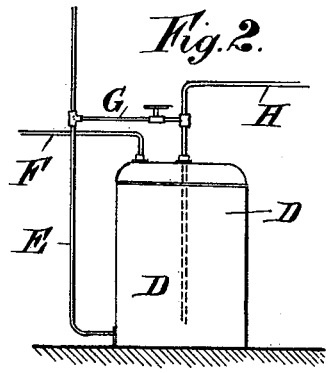
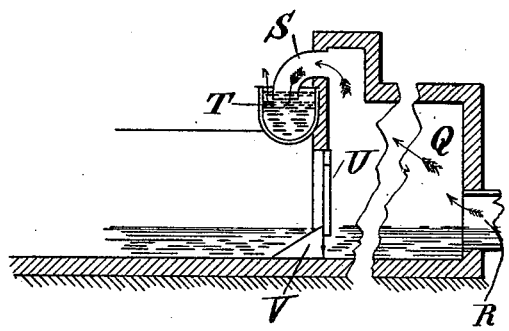
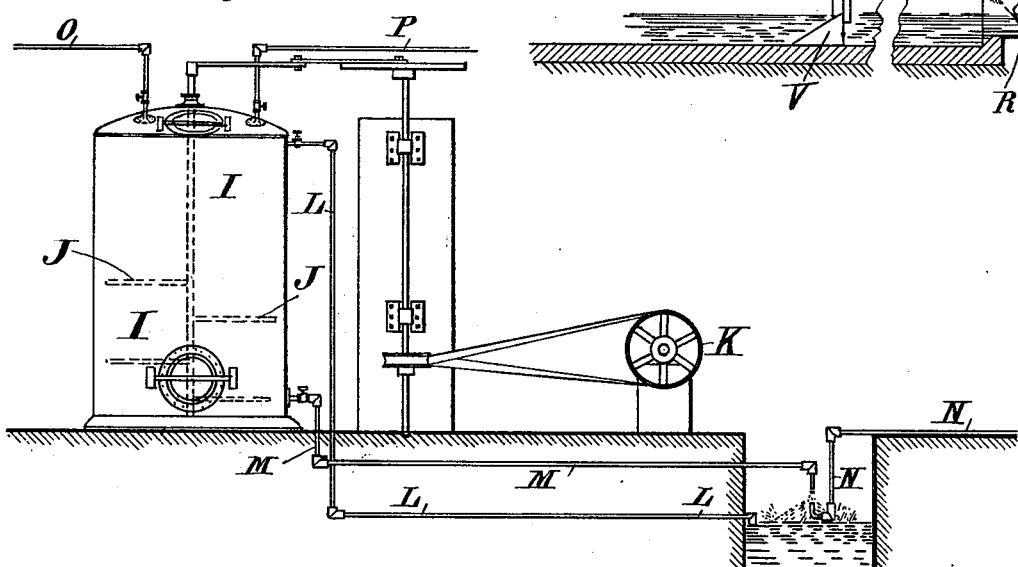

UNITED STATES PATENT OFFICE.

ROBERT HARRIS REEVES, OF LONDON, ENGLAND.

PROCESS OF TREATING SEWAGE.

SPECIFICATION forming part of Letters Patent No. 631,229, dated August 15, 1899.

Application filed December 29, 1897. Serial No. 644,457. (No model.)

*To all whom it may concern:*

Be it known that I, ROBERT HARRIS REEVES, a subject of the Queen of Great Britain, residing at Cedardale, Putney Bridge road, Putney, London, England, have invented certain new and useful Improvements in or Relating to the Treatment of Sewage, (patented in Great Britain, No. 9,558, April 14, 1897,) of which the following is a specification.

This invention has for its object to improve the treatment of sewage at outfall works for destroying its noxious properties and facilitating precipitation of the suspended matter, thereby rendering it capable of being fit for transportation or for fertilizing land.

For the purpose of my invention I mix unslaked lime, gas-tar, and acidulated or other water within a closed tank while under agitation and which mixture when thoroughly associated can be forced or drawn off. For acidulating the water I use sulphuric acid. The vessel or tank can be agitated or revolved either by hand or motive power. A safety-valve is fitted to the vessel to permit the escape of creosote-gases generated by the slaking of lime and the gas-tar mixture beyond the desired pressure required for the thorough association of the material. The result is a chemical disinfecting liquid free from grease which can be employed at the outfalls or collecting-tanks for precipitating and purifying the sewage sludge.

In the accompanying drawings, Figure 1 is an elevation of the mixer for the lime, gas-tar, and acidulated or other water. Fig. 2 is an elevation of the apparatus for supplying the deodorizer in a hot state. Fig. 3 is an elevation of a combined mixing and supplying apparatus. Fig. 4 is a sectional elevation of the outlet portion of a sewer or drain.

When the disinfecting liquid is required for treating sludge only, I prefer to use as a mixer the apparatus herein shown. This consists of a revolving vessel, Fig. 1, on the inside of which are beaters A for the purpose of breaking up and mixing the ingredients during the slaking of the lime. The lime is placed dry in the vessel, to which water acidulated or otherwise is added with gas-tar in proportion to the nature of the sludge. The creosote-gases given off are absorbed partly in the mixture and that beyond the desired pressure passes away through a safety-valve B. During the time required for mixing a revolving motion is kept up and when the ingredients are thoroughly mixed the liquid is drawn off through manhole C and used as required.

Fig. 2 is an apparatus for applying the disinfecting liquid in a diluted condition to the sewage in a hot state under pressure. D is the vessel into which the disinfecting liquid is placed. E is the steam-inlet for heating and agitating the disinfecting liquid. F is the compressed-air supply. G is a branch steam-pipe for mixing steam with the liquid as it is forced from the vessel through delivery-pipe H.

Fig. 3 is a form of mixer for supplying the disinfecting liquid to the sewage at the point where the sewage leaves the rising main or outfall-sewer. I is the mixer the ingredients are placed in, as described with reference to Fig. 1, and mixed by the revolving arms J, the power being supplied from bearings K, driven by hand or otherwise. The gases generated from the material during the process of mixing and which are evolved by the heat produced during the slaking of the lime are conveyed from the vessel through pipe L to the sewage, where it is used as a deodorizer. M is the pipe conveying the disinfecting liquid to the sewage, and it is delivered on the nozzle of steam-pipe N, as shown. This improves the disinfecting liquid and delivers it in the form of a fine spray. O is the water-supply. P is the pipe conveying the compressed air from the receiver for forcing out the disinfecting liquid. On each of the pipes a valve is fixed to control the supply.

Fig. 4 shows the apparatus I prefer to employ to purify the gases given off at the mouth of the outfall-sewer. The chamber Q at the mouth of sewer R is entirely closed in by the floating trap at U and the noxious gases escape through tubes S. The mouths of these tubes are plain or serrated and dip slightly into a trough or other vessel T containing the disinfecting liquid. Thus the air passing through or over the liquid, as indicated by the arrows, is purified before reaching the atmosphere. U is a swinging trap which dips into the sewage to form a seal and allows the sewage to pass under and over the block V along that channel to the tanks.

The sludge by this method or process becomes an excellent fertilizer and quite inodorous.

What I claim, and desire to secure by Letters Patent, is—

1. The method or process herein described of treating sewage at outfall works, which consists in first thoroughly admixing unslaked lime, gas-tar and water, while under agitation in a closed vessel, and then applying, under pressure, the liquid of such mixture, in a diluted and hot condition, to the sewage, substantially as set forth.

2. The method or process herein described of treating sewage at outfall works, which consists in first admixing unslaked lime, gas-tar and acidulated water, while under agitation in a closed vessel, to produce a disinfecting liquid, withdrawing such liquid, and applying it under pressure, in a diluted and hot condition, to the sewage, substantially as set forth.

3. The method or process herein described of treating sewage at outfall works, which consists in admixing unslaked lime, gas-tar and water, while under agitation in a closed vessel, applying the evolved gas under pressure to the sewage, and the liquid to a jet of steam which distributes the liquid at the outfall in spray form, substantially as set forth.

In testimony whereof I have hereunto set my hand in presence of two subscribing witnesses.

ROBERT HARRIS REEVES.

Witnesses:
EDMUND STANHOPE SNEWIN,
WILLIAM OSWALD BROWN.